United States Patent [19]

Maguire

[11] Patent Number: 5,233,757
[45] Date of Patent: Aug. 10, 1993

[54] METHOD OF ASSEMBLING A MOTOR VEHICLE DIFFERENTIAL

[75] Inventor: Joel M. Maguire, Dearborn, Mich.

[73] Assignee: General Motors Corporation, Detroit, Mich.

[21] Appl. No.: 962,553

[22] Filed: Oct. 19, 1992

[51] Int. Cl.$^5$ ............................................. B21K 1/30
[52] U.S. Cl. ................................................. 29/893.1
[58] Field of Search ................ 29/893.1; 475/220, 230

[56] References Cited

U.S. PATENT DOCUMENTS

| | | | |
|---|---|---|---|
| 4,037,492 | 7/1977 | Ashauer et al. | 475/160 |
| 4,305,313 | 12/1981 | Konkle | 475/246 |
| 4,363,248 | 12/1982 | Brisabois | 475/230 |
| 4,455,889 | 6/1984 | Hauser | 475/230 |
| 4,467,672 | 8/1984 | Lamy | 475/246 |

Primary Examiner—P. W. Echols
Attorney, Agent, or Firm—Saul Schwartz

[57] ABSTRACT

A method of assembling a motor vehicle differential of the type including a cup-shaped carrier having an open end, differential pinions and side gears in the carrier, and a unitary plastic separator defining thrust bearings between the carrier and the differential pinions and side gears. A pair of inner bosses are formed on the carrier, each having a spherical bearing seat. A module, consisting of the differential pinions and the side gears in operative relationship within the plastic separator, is preassembled remote from the carrier. The module is advanced into the carrier through the open end of the latter with the differential pinions angularly indexed relative to the bosses for clearance. When the center of the module coincides with a geometric center of the carrier, the module is rotated relative to the carrier to align the differential pinions with the spherical bearing seats.

5 Claims, 2 Drawing Sheets

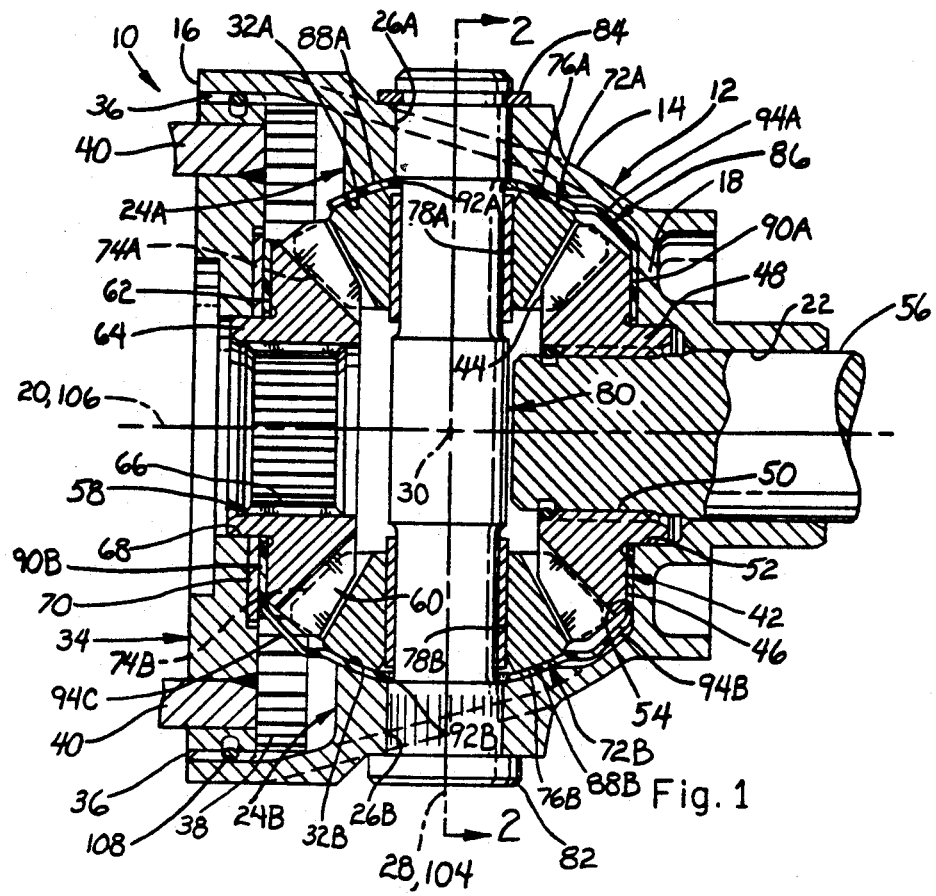
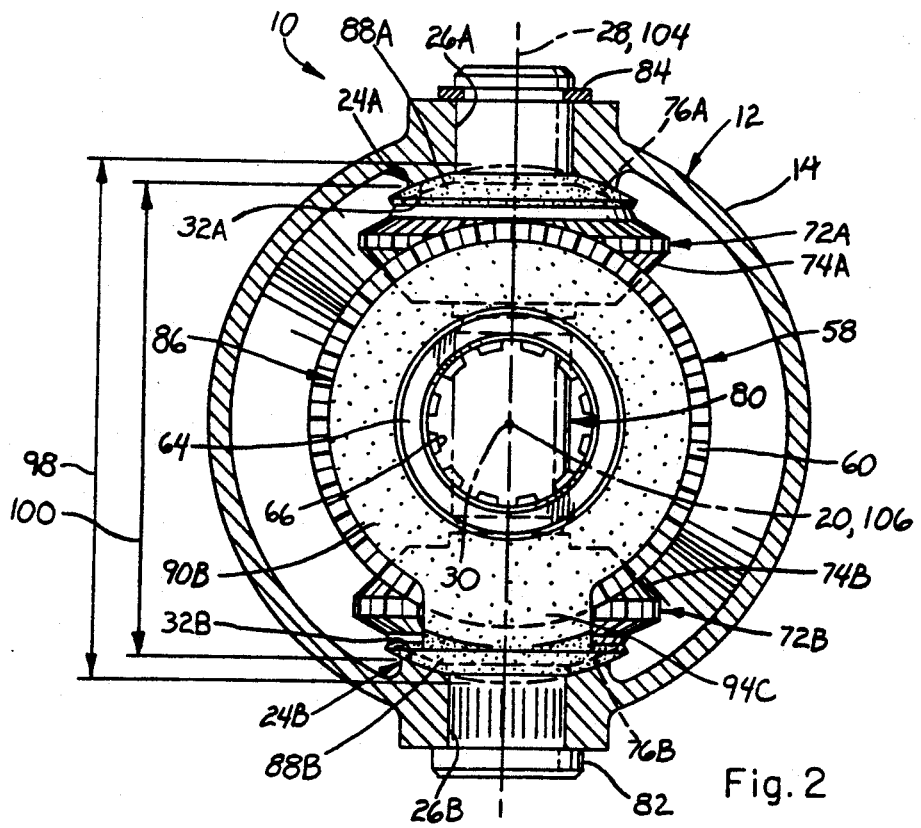

5,233,757

METHOD OF ASSEMBLING A MOTOR VEHICLE DIFFERENTIAL

FIELD OF THE INVENTION

This invention relates to differentials for motor vehicle axle drives.

BACKGROUND OF THE INVENTION

Motor vehicle differentials have been proposed which include a cup-shaped carrier and differential pinions and side gears in the carrier. Typically, the open end of the cup-shaped carrier is closed by a disc-shaped ring gear bolted to the open end of the carrier and defining the drive input member of the differential. Other differentials have been proposed in which a unitary plastic separator is disposed between the carrier and each of the side gears and differential pinions and defines the thrust bearings between the gears and the carrier. A method according to this invention of assembling a differential includes novel steps for simplifying and facilitating assembly of a differential having a cup-shaped carrier and a unitary plastic separator.

SUMMARY OF THE INVENTION

This invention is a new and improved method of assembling a motor vehicle differential having a cup-shaped carrier, a flange for closing the open end of the carrier, a plurality of side gears and differential pinions in the carrier, and a unitary preformed plastic separator defining thrust bearings between the carrier and each of the side gears and differential pinions. In the method according to this invention, spherical bearing seats symmetric with respect to a geometric center of the carrier are formed on internal bosses of the carrier. Spherical shoulders of the same radius as the spherical bearing seats are formed on the differential pinions. The differential pinions, the side gears, and the unitary separator are preassembled remote from the carrier into a module. The module is assembled into the carrier with the side gears aligned on a longitudinal axis of the carrier and the differential pinions angular indexed relative to the bosses on the carrier so that the bosses do not interfere with seating of the module against a closed end of the carrier. Thereafter, the module is rotated about the longitudinal axis of the carrier to align the spherical shoulders on the differential pinions with the spherical bearing seats on the bosses. A pinion shaft is then inserted through diametrically opposite bores in the bosses and through each of the differential pinions. The plastic separator discourages dislodgement of the outer one of the side gears until the flange is installed over the open end of the carrier.

BRIEF DESCRIPTION OF THE DRAWINGS

FIG. 1 is sectional view of a differential, assembled by a method according to this invention, taken generally along a longitudinal centerplane of a carrier of the differential;

FIG. 2 is a transverse sectional view of the differential taken generally along the plane indicated by lines 2—2 in FIG. 1;

DESCRIPTION OF A PREFERRED EMBODIMENT

Figure 3:
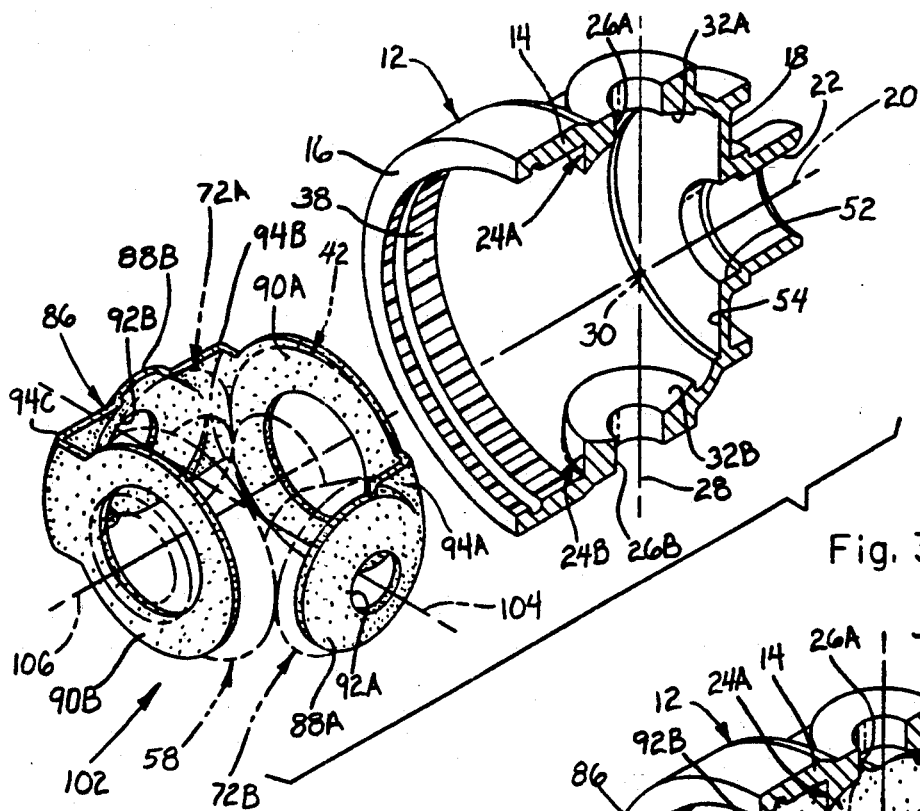
FIG. 3 is an exploded perspective view of a portion of FIG. 1 illustrating one step in the method according to this invention.

Referring to FIG. 1, a differential 10 suitable for motor vehicle drive axles includes a cup-shaped carrier 12 having a side wall 14. The side wall flares out to a circular open end 16 of the carrier and converges to a solid closed end 18 opposite the open end. The open end 16 is symmetric about a longitudinal axis 20 of the carrier and is in a plane perpendicular to the longitudinal axis. A side gear bore 22 through the closed end 18 is likewise symmetric about the longitudinal axis 20. When mounted on a support, not shown, the carrier 12 is rotatable about the longitudinal axis 20.

The carrier 12 further includes a pair of integral inner bosses 24A-B on the side wall 14. Each boss 24A-B has a differential pinion shaft bore 26A-B therethrough, which bores are symmetric with respect to a transverse axis 28 of the carrier. The transverse axis 28 is disposed in a plane perpendicular to the longitudinal axis 20 and intersects the longitudinal axis at a geometric center 30 of the carrier. Each boss has a spherical bearing seat 32A-B thereon facing the inside of the carrier and symmetric about the geometric center 30 of the carrier.

An annular flange 34, FIB. 1, is disposed in the open end 16 of the carrier and restrained against rotation relative to the carrier by a plurality of spline teeth 36 around the periphery of the flange seated between a corresponding plurality of internal spline teeth 38 on the side wall 14 of the carrier. Torque input to the carrier 12 is through the flange 34. In a preferred embodiment, the flange 34 rigidly supports a plurality of pins 40 which receive final drive pinion gears, not shown. Alternatively, the flange 34 could extend beyond the diameter of the open end 16 of the carrier 12 for conventional ring gear type input.

A first or inside side gear 42 of the differential includes a plurality of gear teeth 44, an annular shoulder 46 behind the teeth, a cylindrical stem 48, and a splined bore 50. The stem 48 is journaled in a counter bore 52 in the closed end 18 of the carrier whereby the inside side gear is supported on the carrier for rotation about the longitudinal axis 20 with the annular shoulder 46 facing a corresponding annular shoulder 54 on the closed end of the carrier. A splined end of a first output shaft 56 is received in the splined bore 50 of the inside side gear 42 for rotation as a unit with the latter.

A second or outside side gear 58 of the differential includes a plurality of gear teeth 60, an annular shoulder 62 behind the teeth, a cylindrical stem 64, and a splined bore 66. The stem 64 is journaled in a bore 68 in the flange 34 whereby the outside side gear is supported on the carrier for rotation about the longitudinal axis 20 with the annular shoulder 62 facing an annular bearing insert 70 on the flange 34. A splined end of a second output shaft, not shown, is received in the splined bore 66 of the outside side gear 58 for rotation as a unit with the latter.

Each one of a pair of identical differential pinions 72A-B in the carrier has a plurality of gear teeth 74A-B, a spherical shoulder 76A-B behind the gear teeth, and a centerbore 78A-B. The radius of each of the spherical shoulders 76A-B is the same as the radius of the spherical bearing seats 32A-B on the bosses 24A-B. The gear teeth 74A-B of the differential pinions mesh with the gear teeth 44,60 of the side gears 42,58 in the usual fashion.

A differential pinion shaft 80 having opposite ends received in the differential pinion shaft bores 26A-B receives, in turn, the bores 78A-B of the differential pinions 72A-B whereby the latter are supported on the carrier for rotation about the transverse axis 28. An upset head 82 at one end of the differential pinion shaft cooperates with a retaining ring 84 in a groove at the other end of the differential pinion shaft in preventing dislodgement of the shaft from the carrier and in containing thrust in the direction of the transverse axis 28.

A preformed plastic separator 86 of the differential includes a pair of spherical differential pinion bearings 88A-B and a pair of flat, annular side gear bearings 90A-B. Each differential pinion bearing has a hole 92A-B therein for the differential pinion shaft. A plurality of integral webs 94A-C connect, in serial order, the differential pinion bearing 88A to the side gear bearing 90A, the side gear bearing 90A to the differential pinion bearing 92B, and the differential pinion bearing 92B to the side gear bearing 90B. The webs afford a degree of flexibility to the separator which permits elastic expansion of a gap between the side gear bearing 90B and the pinion bearing 88A.

The radius of each of the spherical differential pinion bearings 88A-B is the same as the radii of the spherical bearing seats 32A-B and the spherical shoulders 76A-B. In an assembled position of the separator 86 relative to the carrier 12 and the gears 42,58 and 72A-B, FIGS. 1-2 and 4-5, the bearings 88A-B, 90A-B of the separator are disposed, respectively, between the differential pinions 72A-B and the carrier and between side gears 42,58 and the carrier. The bearings 88A-B, 90A-B, therefore, define thrust bearings between the carrier and the gears 42,58 and 72A-B.

In operation, input torque is applied to the differential through the flange 34 closing the open end of carrier 12. Input torque is then transferred to the differential pinions 72A-B through the differential pinion shaft 80 and divided between the side gears 42,58 by the differential pinions. The side gears 42,58, in conventional differential fashion, drive the output shafts represented by the shaft 56 while permitting relative rotation therebetween.

Figure 4:
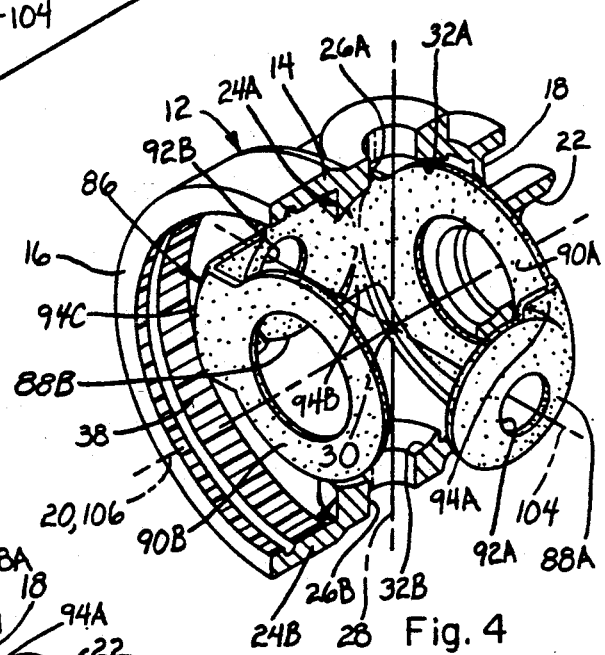
FIG. 4 is similar to FIG. 3 but illustrating another step in the method according to this invention.
Figure 5:
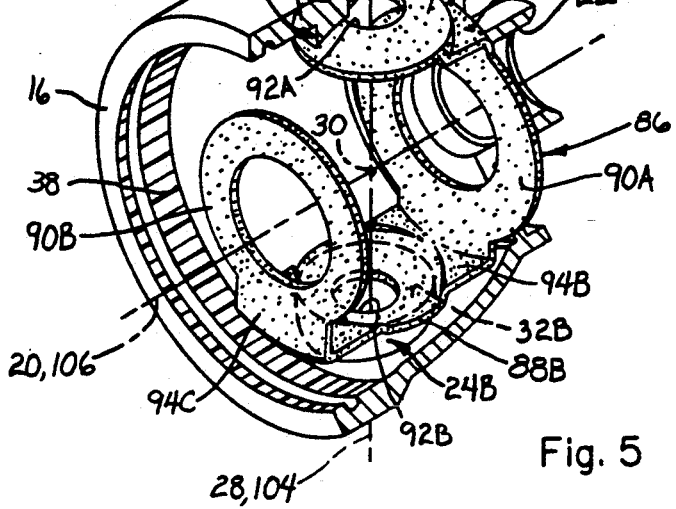
FIG. 5 is similar to FIG. 3 but illustrating still another step in the method according to this invention.

With particular reference to FIGS. 3-5, the method according to this invention of assembling the differential 10 is described as follows. The cup-shaped carrier 12 is formed with the inner bosses 24A-B at diametrically opposite locations on the side wall 14 of the carrier. The bosses are formed with the spherical bearing seats 32A-B facing the inside of the carrier and symmetric about the geometric center 30 of the carrier. Due to the symmetry of the bearing seats 32B about the geometric center, a maximum lateral dimension 98, FIG. 2, between the bearing seats exceeds a minimum lateral dimension 100 between the bosses 24A-B.

The differential pinions 72A-B, the side gears 42,58, and the unitary plastic separator 86 are preassembled remote from the carrier 12 to form a module 102, FIG. 3. The side gears and the differential pinions are preassembled in operative or meshing relationship inside the separator, which may be flexed open to facilitate insertion of the gears. The spherical shoulders 76A-B on the differential pinions 72A-B are seated against the differential pinion bearings 88A-B and the annular shoulders 46,62 on the side gears 42,58 are seated against the annular bearings 90A-B. In that relationship, the differential pinions are symmetric with respect to a first centerline 104 of the module 102 and the side gears are symmetric with respect to a second centerline 106 of the module perpendicular to the first centerline. The preformed or molded character of the plastic separator 86 operates to hold the module 102 together.

The module 102 is positioned relative to the carrier 12 such that the second centerline 106 of the module coincides with the longitudinal axis 20 of the carrier and the first centerline 104 is angularly indexed relative to the transverse axis 28 of the carrier by an included angle of about 90 degrees, FIG. 3. The minimum magnitude of the aforesaid included angle is a magnitude sufficient to rotate the differential pinions 72A-B and the bearings 88A-B of the separator 86 completely out of the way of the bosses 24A-B. Rotation or indexing of the module 102 is necessary because the maximum outside dimension of the module exceeds the minimum dimension 100 between the bosses.

In its indexed position relative to the carrier, the module 102 is advanced in the direction of the longitudinal axis 20 into the carrier until the side gear bearing 90A engages the annular shoulder 54 on the closed end 18 of the carrier. In that position, the center of the module 102 coincides with the geometric center 30 of the carrier so that the differential pinion bearings 88A-B of the separator 86 are at the same radius from the geometric center 30 as the spherical bearing seats 32A-B on the bosses 24A-B.

The module 102 is then rotated counterclockwise, FIGS. 3-5, about the longitudinal axis 20 relative to the carrier 12 until the first centerline 104 coincides with the transverse axis 28. In that position, the module 102 is captured on the carrier by virtue of the spherical shoulders of the differential pinions nesting or seating in the spherical bearing seats on the bosses and the maximum dimension of the module in the direction of the first centerline 104 exceeding the minimum dimension 100 between the bosses. The side gear bearing 90B of the separator 86, being disposed over the side gear 58 in the open end 16 of the carrier 12, minimizes the likelihood of the side gear 58 becoming dislodged from the carrier.

After the module 102 is rotated as described, the pinion shaft 80 is assembled through the bores 26A-B in the carrier, the holes 92A-B in the separator 86, and the differential pinions 72A-B. When the retaining ring 84 is seated in its groove in the differential pinion shaft, the shaft is captured on the carrier and the pinions are supported on the carrier for independent rotation about the transverse axis 28. Importantly, differential pinion thrust in the direction of transverse axis 28 toward the ends of the differential pinion shaft is reacted wholly by the shaft through the upset head 82 and the retaining ring 84 so that the thickness dimension of the side wall 14 of the carrier may be minimized for low mass performance advantages.

In a final step of the method according to this invention, the flange 34 is assembled in the open end 16 of the carrier 12 with spline teeth 36 of the flange engaging carrier spline teeth 38. An internal retaining ring 108, FIG. 1, may be employed to prevent dislodgement of the flange from the carrier and to react side gear thrust from the flange to the carrier.

I claim:

1. A method of assembling a motor vehicle differential, said differential including a cup-shaped carrier having a side wall and an open end each symmetric about a longitudinal axis of said carrier, a pair of differential pinions each having a spherical shoulder, a pair of side gears, and a unitary plastic separator including a pair of spherical differential pinion bearings having the same radius as said spherical shoulders on said differential pinions, said method comprising said steps of:

forming on said side wall of said carrier a pair of inner bosses, forming on each of said inner bosses a spherical bearing seat having a radius equal to the radii of said spherical shoulders on said differential pinions and said differential pinion bearings on said separator and being symmetric with respect to a geometric center of said carrier defined at the intersection of said longitudinal axis and a transverse axis of said carrier perpendicular to said longitudinal axis, forming a preassembled module consisting of said side gears and said differential pinions in operative relationship within said plastic separator with said differential pinions symmetric with respect to a first centerline of said module and said side gears symmetric with respect to a second centerline of said module perpendicular to said first centerline and intersecting said first centerline at a center of said module, positioning said module relative to said carrier such that said second centerline of said module coincides with said longitudinal axis of said carrier and said first centerline of said module is angularly indexed from said transverse axis of said carrier by an angle sufficient to assure clearance between said module and said inner bosses on said carrier, advancing said module into said carrier until said center of said module coincides with said geometric center of said carrier, rotating said module relative to said carrier about said longitudinal axis of said carrier until said differential pinion bearings and said spherical shoulders of said differential pinions coincide with said spherical bearing seats on said bosses, and connecting said differential pinions to said carrier for rotation about said transverse axis relative to said carrier.

2. The method recited in claim 1 wherein the step of connecting said differential pinions to said carrier includes the steps of:

forming a differential pinion shaft, forming in each of said inner bosses a differential pinion bearing shaft bore, forming a centerbore in each of said differential pinions, forming a differential pinion shaft hole in each of said differential pinion bearings of said separator, and inserting said differential pinion shaft through said differential pinion bores and said differential pinion shaft holes and said centerbores in said differential pinions.

3. The method recited in claim 2 further including the step of:

forming a torque input member of said differential, and closing said open end of said cup-shaped carrier by rigidly attaching said torque input member to said carrier in said open end thereof.

4. The method recited in claim 3 wherein the step of forming a torque input member includes the steps of:

forming a flange adapted for attachment to said carrier in said open end thereof, and forming on said flange means for applying input torque thereto.

5. The method recited in claim 4 wherein the step of forming on said flange means for applying input torque thereto includes the step of:

forming on said flange a plurality of rigid pins adapted to rotatably support a plurality of input pinion gears.

* * * * *